US011513737B2

(12) United States Patent
Sadeh-Weinraub et al.

(10) Patent No.: US 11,513,737 B2
(45) Date of Patent: Nov. 29, 2022

(54) PREVENTING DATA OVERFLOW IN EDGE COMPUTING SYSTEMS

(71) Applicant: RED HAT, INC., Raleigh, NC (US)

(72) Inventors: Yehuda Sadeh-Weinraub, Culver City, CA (US); Huamin Chen, Westboro, MA (US); Ricardo Noriega De Soto, Madrid (ES)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/232,755

(22) Filed: Apr. 16, 2021

(65) Prior Publication Data
US 2022/0334764 A1      Oct. 20, 2022

(51) Int. Cl.
*G06F 3/06*      (2006.01)
(52) U.S. Cl.
CPC ............ *G06F 3/0659* (2013.01); *G06F 3/067* (2013.01); *G06F 3/0619* (2013.01); *G06F 3/0634* (2013.01); *G06F 3/0644* (2013.01); *G06F 3/0656* (2013.01)
(58) Field of Classification Search
CPC .... G06F 3/0659; G06F 3/0619; G06F 3/0656; G06F 3/0644; G06F 3/0634; G06F 3/067
See application file for complete search history.

(56) References Cited

U.S. PATENT DOCUMENTS

| 8,874,863 | B2 | 10/2014 | Mutalik et al. | |
|---|---|---|---|---|
| 9,015,122 | B2 | 4/2015 | Harrison et al. | |
| 11,297,171 | B2 * | 4/2022 | Chun | H04L 67/141 |

(Continued)

FOREIGN PATENT DOCUMENTS

| CN | 102394930 B | 11/2014 |
|---|---|---|
| CN | 111404978 A | 7/2020 |

(Continued)

OTHER PUBLICATIONS

Lin, Y., et al., "Enhancing Edge Computing with Database Replication," 26th IEEE International Symposium on Reliable Distributed Systems, 2007, https://ieeexplore.ieee.org/document/4365683.

(Continued)

*Primary Examiner* — Mark A Giardino, Jr.
(74) *Attorney, Agent, or Firm* — Kilpatrick Townsend & Stockton LLP (57) ABSTRACT

Data overflows can be prevented in edge computing systems. For example, an edge computing system (ECS) can include a memory buffer for storing incoming data from client devices. The ECS can also include a local storage device. The ECS can determine that an amount of available storage space in the local storage device is less than a predefined threshold amount. Based on determining that the amount of available storage space is less than the predefined threshold amount, the ECS can prevent the incoming data from being retrieved from the memory buffer. And based on determining that the amount of available storage space is greater than or equal to the predefined threshold amount, the ECS can retrieve the incoming data from the memory buffer and store the incoming data in the local storage device. This may prevent data overflows associated with the local storage device.

20 Claims, 3 Drawing Sheets

(56) References Cited

U.S. PATENT DOCUMENTS

| | | | |
|---|---|---|---|
| 2012/0124294 A1* | 5/2012 | Atkisson | G06F 12/0804 |
| | | | 711/135 |
| 2014/0068015 A1 | 3/2014 | Shin | |
| 2018/0329824 A1* | 11/2018 | Adachi | G06F 3/0656 |
| 2019/0354628 A1 | 11/2019 | Grunwald et al. | |

FOREIGN PATENT DOCUMENTS

| | | |
|---|---|---|
| CN | 111405614 B | 9/2020 |
| EP | 3396522 A1 | 10/2018 |

OTHER PUBLICATIONS

Mealha, D., et al., "Data Replication on the Cloud/Edge," Association for Computing Machinery, 2019, https://dl.acm.org/doi/abs/10.1145/3301419.3323973.

Kaya, J., "Storage Networking across the MAN and WAN," Technical Symposium, 2003, • https://www.cisco.com/c/dam/global/fr_ca/training-events/pdfs/Storage_Networking_Across_The_MAN_WAN.pdf.

European Patent Application No. 21181909.9, Extended European Search Report dated Dec. 20, 2021, 9 pages.

\* cited by examiner

PREVENTING DATA OVERFLOW IN EDGE COMPUTING SYSTEMS

TECHNICAL FIELD

The present disclosure relates generally to preventing data overflows in memory devices. More specifically, but not by way of limitation, this disclosure relates to preventing data overflow in edge computing systems.

BACKGROUND

Distributed computing systems (e.g., cloud computing systems, data grids, and computing clusters) have recently grown in popularity given their ability to improve flexibility, responsiveness, and speed over conventional computing systems. In some cases, the responsiveness and speed of distributed computing systems can be further improved by employing edge computing solutions. Edge computing is a networking philosophy focused on bringing computing power and data storage as close to the source of the data as possible to reduce latency and bandwidth usage. In general, edge computing can involve executing services on nodes that are positioned at the physical edges of a distributed computing system. Examples of such services may include data-processing services and data-storage services. Positioning the nodes at the physical edges of the distributed computing system can result in the nodes being physically closer to the client devices that provide data to the distributed computing system. This relatively close physical proximity of the edge nodes to the client devices can reduce latency and improve the perceived quality of the services.

DETAILED DESCRIPTION

A distributed computing system can include an edge computing system to improve the responsiveness and speed of services supplied to client devices. An edge computing system can be a computing system that is positioned at the physical edge of the distributed computing system, so that the edge computing system is physically closer to the client devices than non-edge parts of the distributed computing system. The edge computing system can include one or more edge nodes, which are nodes (e.g., servers) that are positioned at the physical edge of the distributed computing system. The edge nodes may be capable of providing services to the client devices at a faster speed than may be possible without such an edge computing system. Despite these and other advantages of edge computing systems, edge computing systems also have limitations. For example, edge computing systems are often limited in compute power and data storage capacity, given the administrative and financial burden of maintaining a large number of geographically dispersed edge computing systems. As a particular example, edge nodes offered by Amazon Web Services® may have just two central processing units, four gigabytes of memory, and eight terabytes of usable storage. These capacity limitations are becoming more pronounced with the advancement of 5G and other technologies, because data is being generated and transmitted at an exponential rate at the edge.

The rapid generation and transmission of data to edge nodes with limited computing and storage capacity can result in numerous problems. For example, an edge computing system may be configured to receive data from client devices, store the data in a local storage device for a period of time (e.g., to perform certain processing operations on the data), and then replicate the data to remote storage such as cloud storage, so that the data can be removed from the local storage device to free up space for new data from the client devices. Replicating data to remote storage can involve copying the data from the local storage device to a remote storage device and removing the data from the local storage device once the copying process is complete. But if the client devices transmit data to the edge computing system at a faster rate than the edge computing system is replicating its stored data to remote storage, a data overflow can occur. A data overflow can refer to the situation in which there is insufficient free space in the local storage device to write the new data from the client devices, which may cause at least some of the existing data (e.g., non-replicated data) in the local storage device to be overwritten. This can result in the corruption or loss of the overwritten data, among other issues.

Certain aspects and features of the present disclosure can overcome one or more of the abovementioned problems by providing an edge computing system that can use memory buffers at the transport layer of the network stack to prevent a local storage device of the edge computing system from overfilling. For example, the edge computing system can include a local storage device, which can be a storage device that is local to the edge computing system. The edge computing system can communicate with the local storage device to determine whether the amount of available storage space in the local storage device is above or below a predefined threshold amount (e.g., 5%). If the amount of available storage space is below the predefined threshold amount, the edge computing system can receive incoming data from the client devices at the transport layer of the network stack and maintain the incoming data in one or more memory buffers associated with the transport layer of the network stack, rather than immediately copying the incoming data to the local storage device. While the incoming data is maintained in the memory buffers, the edge computing system can also replicate data from the local storage device to remote storage. Due to this replication process, the amount of available storage space in the local storage device will eventually increase above the predefined threshold amount. Once the amount of available storage space in the local storage device is above the predefined threshold amount, the edge computing system can retrieve the incoming data from the memory buffers, store it in the local storage device, and remove (e.g., delete) it from the memory buffers. In some examples, the edge computing system may only acknowledge receipt of the incoming data to the client devices once the incoming data has been written to the local storage device, so that the client devices will re-send the data in the event of a memory-buffer overflow. This process can be repeated each time the amount of available storage space in the local storage device falls below the predefined threshold amount, to help prevent data overflow with respect to the local storage device.

In some examples, the edge computing system can use one or more additional or alternative techniques to help prevent data overflow with respect to the local storage device. For example, the edge computing system can determine a storage rate and a removal rate. The storage rate can be a first rate at which the incoming data from the client devices is stored to the local storage device by the edge computing system. The removal rate can be a second rate at which stored data is removed from the local storage device (e.g., subsequent to being replicated to remote storage). The edge computing system can monitor these rates to determine if the storage rate exceeds the removal rate, which may lead to a data overflow. If so, the edge computing system can adjust the storage rate or the removal rate. For example, the edge computing system can adjust the storage rate by transmitting communications to the client devices for causing the client devices to slow their rate of data transmission to the edge computing system. As another example, the edge computing system can adjust the removal rate by switching from (i) a first mode in which the stored data is asynchronously replicated to remote storage, to (ii) a second mode in which the stored data is synchronously replicated to remote storage. Switching from the first mode to the second mode may result in faster replication of the stored data, helping to prevent a data overflow with respect to the local storage device.

In some examples, the edge computing system can predict whether the local storage device is going to have less than the predefined threshold amount of available storage space at a future point in time and, if so, proactively perform one or more operations to prevent this event. For example, the edge computing system can access historical information associated with data received from the client devices in the past. The historical information may include the rates at which data was received from the client devices in the past, the types (e.g., a music, movie, image, or text file) of data received from the client devices in the past, storage rates in the past, removal rates in the past, or any combination of these. As one particular example, the historical information may be a time series indicating the amount of data transmitted by the client devices to the edge computing system over a prior timespan. The edge computing system can analyze the historical information to predict whether the local storage device is going to have less than the predefined threshold amount of available storage space at a future point in time. For example, the edge computing system can provide the historical information as input to a model (e.g., a neural network, an autoregressive integrated moving average model, or a regression model) to generate a forecast of the amount of free space in the local storage device at various points in the future. The edge computing system can then analyze the forecast to determine if the amount of free space in the local storage device will be less than or equal to the threshold amount at a future point in time. If so, the edge computing system can perform one or more operations, such as decreasing the storage rate or increasing the removal rate, to help prevent data overflow with respect to the local storage device. The edge computing system may repeat this process at periodic intervals or substantially continuously, to help prevent data overflows from occurring.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
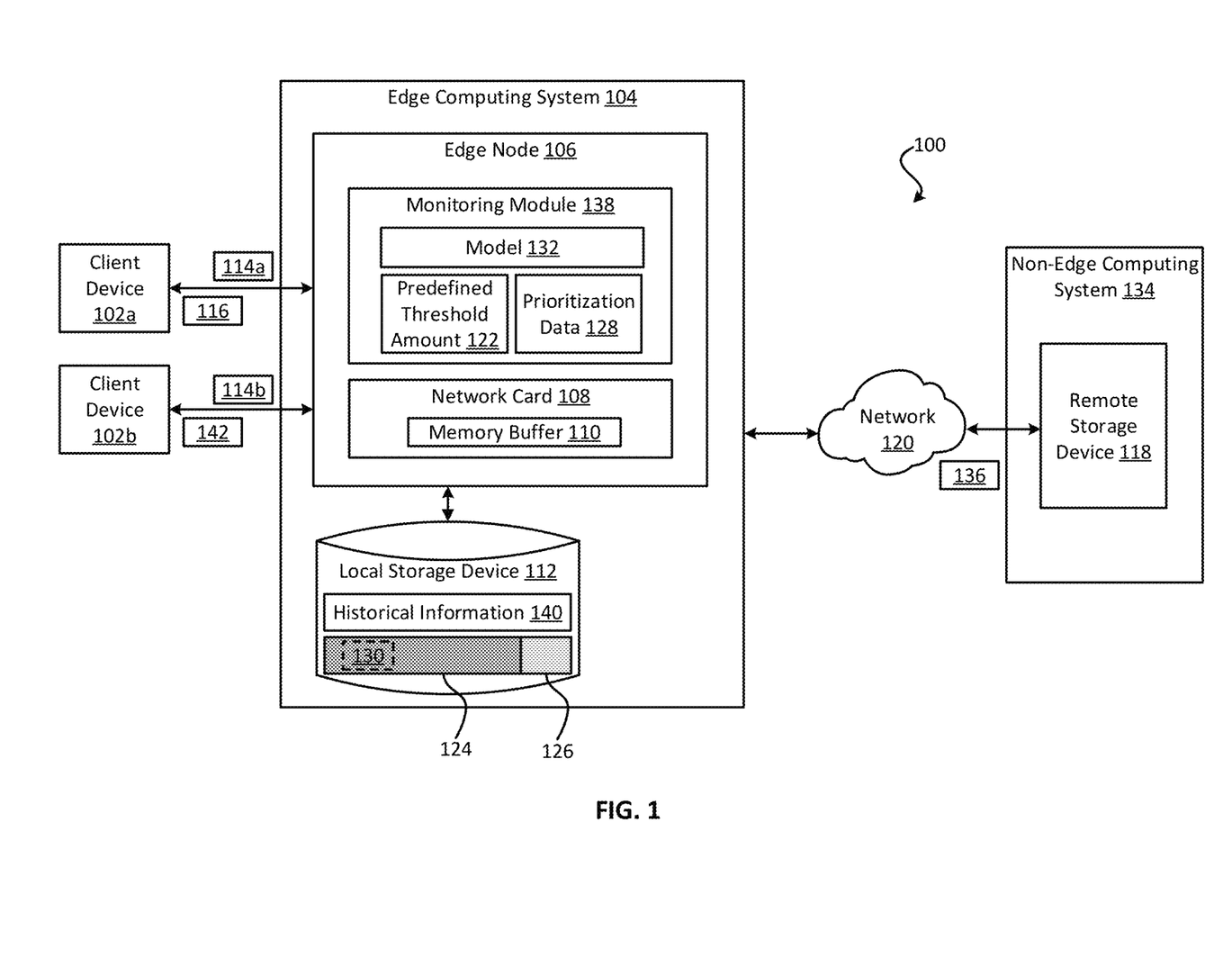
FIG. 1 is a block diagram of an example of distributed computing system according to some aspects of the present disclosure.

FIG. 1 is a block diagram of an example of a distributed computing system 100 according to some aspects of the present disclosure. The distributing computing system 100 includes an edge computing system 104 and a non-edge computing system 134. The edge computing system 104 can be located at the physical edges of the distributed computing system 100 and in geographically closer proximity to client devices 102a-b than the non-edge computing system 134. The edge computing system 104 can be configured to provide services, such as data-processing services or data-storage services, to any number and combination of client devices 102a-b. Examples of the client devices 102a-b can include mobile phones, Internet of Things (IoT) devices, sensors, laptop computers, desktop computers, wearable devices, servers, or any combination of these.

The edge computing system 104 can include nodes configured to provide services to the client devices 102. These nodes can be referred to as edge nodes, since they are part of the edge computing system 104 and they are located at the physical edges of the distributed computing system 100. Although only one edge node 106 is shown in FIG. 1 for simplicity, the edge computing system 104 can include any number and combination of edge nodes that can individually or collectively implement some or all of the functionality described herein. Thus, the edge node 106 described herein can represent one edge node or multiple edge nodes.

The edge node 106 can receive incoming data 114a-b from client devices 102a-b and store the incoming data 114a-b in a local storage device 112. In some examples, the incoming data 114a-b can include data objects and the local storage device can include object storage. As used herein, the term "incoming data" can include the raw data provided by the client devices 102a-b or a processed version of the raw data generated by the edge computing system 104. For example, the edge node 106 may receive the raw data from the client devices 102a-b, process the raw data to generate processed data, and store the processed data in the local storage device 112. In such an example, the processed data could still be considered "incoming data."

The local storage device 112 can be any suitable storage device that is internal to the edge computing system 104. Examples of the local storage device 112 can include a hard disk and a solid-state drive (SSD). Although the local storage device 112 is shown in FIG. 1 as being separate from and communicatively coupled to the edge node 106 (e.g., via a local area network or a direct communication line), in other examples the local storage device 112 may be internal to the edge node 106.

The edge node 106 can also transmit (e.g., replicate) stored data 130 in the local storage device 112 to a remote storage device 118, which may form part of the non-edge computing system 134. The remote storage device 118 can be any suitable storage device that is external to the edge computing system 104 and accessible to the edge computing system 104 via a network 120, such as a wide area network or the Internet. Examples of the remote storage device 118 can include a hard disk and a solid-state drive (SSD). The edge node 106 may periodically transmit the stored data 130 in the local storage device 112 to the remote storage device 118, in some examples. Additionally or alternatively, the edge node 106 can transmit the stored data 130 to the remote storage device 118 in response to one or more events. In response to receiving the stored data 130, the remote storage device 118 can transmit an acknowledgement 136 of the stored data 130 back to the edge node 106. The edge node 106 can receive the acknowledgement 136 and responsively remove the stored data 130 from the local storage device 112 to free up memory space.

In some examples, the edge node 106 can concurrently store incoming data 114a-b to the local storage device 112 and transmit stored data 130 from the local storage device 112 to the remote storage device 118. For example, the edge node 106 can execute two processing threads in parallel, where one processing thread can store incoming data 114a-b to the local storage device 112 and the other processing thread can transmit stored data 130 from the local storage device 112 to the remote storage device 118.

As noted above, traditional edge-computing systems may experience data overflows with respect to the local storage device 112 under various circumstances, such as if the client devices 102a-b are transmitting the incoming data 114a-b at a faster rate than stored data 130 is being removed from the local storage device 112. Such data overflows may lead to the corruption or deletion of data. To help avoid these or other problems, in some examples the edge node 106 can include a monitoring module 138 and one or more memory buffers 110. The monitoring module 138 can use the memory buffers 110 to implement one or more throttling processes, which may prevent or reduce data overflows.

More specifically, the monitoring module 138 is a software module that may be, for example, downloaded from the Internet and installed on the edge node 106. The memory buffers 110 can be located in a network card 108 of the edge node 106, a host memory (e.g., random access memory, a cache, or a hard disk) of the edge node 106, or elsewhere in the edge node 106. The memory buffers 110 can be associated with a transport layer of the network stack, where the transport layer can refer to the fourth layer of the Open Systems Interconnection (OSI) model. For example, the network card 108 can receive the incoming data 114a-b from the client devices 102a-b at the network card 108 and store (e.g., temporarily) the incoming data 114a-b in the memory buffers 110.

The monitoring module 138 can monitor the amount of available storage space 126 in the local storage device 112. For example, the monitoring module 138 can periodically communicate with the local storage device 112 to determine the amount of used space 124 in the local storage device 112 and/or the amount of available storage space 126 in the local storage device 112. The monitoring module 138 can then determine whether the amount of available storage space 126 in the local storage device 112 is greater than a predefined threshold amount 122 at a given point in time. The predefined threshold amount 122 may be set by the user or preset by a developer of the monitoring module 138. If the amount of available storage space 126 in the local storage device 112 is greater than the predefined threshold amount 122, the monitoring module 138 can retrieve the incoming data 114a-b from the memory buffers 110 and store the incoming data 114a-b (e.g., before or after processing it) in the local storage device 112. The monitoring module 138 may then remove the incoming data 114a-b from the memory buffers 110. If the amount of available storage space 126 in the local storage device 112 is less than the predefined threshold amount 122, the monitoring module 138 can implement a throttling process. The throttling process can involve the monitoring module 138 maintaining the incoming data 114a-b in the memory buffers 110, and not storing the incoming data 114a-b in the local storage device 112, at least until the amount of available storage space 126 in the local storage device 112 is greater than or equal to the predefined threshold amount 122. In this way, the monitoring module 138 can prevent the incoming data 114a-b from being stored in the local storage device 112 in circumstances in which the amount of available storage space 126 is below the predefined threshold amount 122, which may prevent data overflows.

In some examples, the monitoring module 138 may also prevent the edge node 106 from transmitting acknowledgements 116 of the incoming data 114a-b until after the incoming data 114a-b is transferred from the memory buffers 110 to the local storage device 112. This may help to resolve data overflows in the memory buffers 110, since the client devices 102a-b may re-send the incoming data 114a-b to the edge node 106 if they do not receive acknowledgements 116 of the data.

In some examples, multiple edge nodes may coordinate with one another to distribute the incoming data 114a-b among their memory buffers, which can help prevent data overflows in the memory buffers. For example, edge computing system 104 can include multiple edge nodes, each of which can have one or more memory buffers. The edge nodes can store incoming data 114a-b to the local storage device 112, which can serve as a centralized storage device usable by the multiple edge nodes. If one of the edge nodes 106 receives incoming data 114a and its memory buffer(s) 110 are full, the edge node 106 can communicate with the other edge nodes to determine which of the other edge nodes has memory buffers with sufficient capacity to store the incoming data 114a. The edge node 106 can then forward the incoming data 114 to another edge node that has sufficient capacity. The other edge node can receive the incoming data 114 and store it in its memory buffers, which can prevent a data overflow in the memory buffers 110 of the edge node 106. The other edge node can then implement one or more of the throttling processes described herein. For example, the other edge node can maintain the incoming data 114a in its memory buffers until the amount of available storage space 126 in the local storage device 112 is greater than the predefined threshold amount 122, at which point the other edge node can retrieve the incoming data 114a from its memory buffers and store the incoming data 114a in the local storage device 112.

Although a particular throttling process is described above, the monitoring module 138 can additionally or alternatively implement other throttling processes to help prevent data overflows with respect to the local storage device 112. For example, the monitoring module 138 can determine a storage rate and a removal rate associated with the local storage device 112. The storage rate can be a first rate at which the incoming data 114a-b from the client devices 102a-b is stored to the local storage device 112 by the edge node 106. The removal rate can be a second rate at which stored data 130 is removed from the local storage device 112 (e.g., subsequent to being transmitted to a remote storage device 118) by the edge node 106. The monitoring module 138 can monitor these rates to determine if the storage rate exceeds the removal rate, which may lead to a data overflow. If so, the monitoring module 138 can adjust the storage rate or the removal rate. For example, the monitoring module 138 can adjust the storage rate by transmitting communications 142 to the client devices 102a-b for causing the client devices 102a-b to slow their rate of data transmission to the edge node 106. As another example, the monitoring module 138 can adjust the removal rate by switching from (i) a first mode in which the stored data 130 is asynchronously transmitted to the remote storage device 118, to (ii) a second mode in which the stored data 130 is synchronously transmitted to the remote storage device 118. Switching from the first mode to the second mode may result in faster transmission of the stored data 130, which can help prevent data overflows with respect to the local storage device 112.

In some examples, the monitoring module 138 can implement a predictive throttling process. For example, the monitoring module 138 can predict whether the local storage device 112 is going to have less than the predefined threshold amount 122 of available storage space in the future and, if so, perform one or more operations to prevent that from happening. For example, the monitoring module 138 can access historical information 140 associated with data received from the client devices in the past. The historical information 140 may be located in the local storage device 112, a host memory of the edge node 106, or elsewhere in the distributed computing system 100. The historical information 140 may include the rates at which data was received from the client devices 102a-b in the past, the types (e.g., a music, movie, image, or text file) of data received from the client devices 102a-b in the past, storage rates in the past, removal rates in the past, or any combination of these. For instance, the historical information 140 may be a time series indicating the amount of data transmitted by the client devices 102a-b to the edge node 106 over a prior timespan. The monitoring module 138 can use the historical information 140 to predict whether the local storage device 112 is going to have less than the predefined threshold amount 122 of available storage space in the future. If so, the monitoring module 138 can perform one or more operations to help prevent data overflow with respect to the local storage device 112. Examples of such operations may include decreasing the storage rate or increasing the removal rate. The monitoring module 138 may repeat this predictive throttling process a periodic intervals, substantially continuously, or in response to certain events, in order to help prevent data overflows from occurring with respect to the local storage device 112.

The monitoring module 138 can use the historical information 140 in any number of ways to predict whether the local storage device 112 is going to have less than the predefined threshold amount 122 of available storage space in the future. For example, the monitoring module 138 can provide the historical information 140 as input to a model 132, such as a neural network, an autoregressive integrated moving average (ARIMA) model, an exponential smoothing model (ESM), or a regression model. Based on the input, the model 132 can generate an output prediction indicating the amount of free space in the local storage device 112 at a future point in time. As another example, the model 132 can be a machine-learning model that is trained based on the historical information 140. After the model 132 is trained, the monitoring module 138 can provide an input to the model 132. The input may specify, for example, a current rate, type, client device, or user associated with incoming data. Additionally or alternatively, the input may specify a current storage rate or a current removal rate. Based on the input, the model 132 can generate an output prediction indicating the amount of free space in the local storage device 112 at a future point in time.

In some examples, the monitoring module 138 may or may not throttle the incoming data 114a-b, or may throttle the incoming data 114a-b in different ways, depending on priority levels associated with the incoming data 114a-b. For example, the prioritization data 128 can specify that the client device 102a has a first priority level that is higher than a second priority level associated with client device 102b. A reason that client device 102a may have a higher priority level than client device 102b could be that a user of client device 102a has paid for a higher subscription level than a user of client device 102b. Based on this prioritization scheme, the monitoring module 138 may prioritize the incoming data 114a from client device 102a over the incoming data 114b from client device 104b. For example, the monitoring module 138 can apply one or more of the throttling processes described herein to the incoming data 114b and not to the incoming data 114a. Alternatively, the monitoring module 138 can apply a first throttling process described herein to the incoming data 114b and a second throttling process described herein to the incoming data 114a. As another example, the incoming data 114a may be of a first type (e.g., a video file or music file) and the other incoming data 114b may be of a second type (e.g., a text file). And the prioritization data 128 specify that the first type of data has a first priority level that is higher than a second priority level associated with the second type of data. Based on this prioritization scheme, the monitoring module 138 may prioritize the incoming data 114a over the incoming data 114b. For example, the monitoring module 138 can apply one or more of the throttling processes described herein to the incoming data 114b and not to the incoming data 114a. Alternatively, the monitoring module 138 can apply a first throttling process described herein to the incoming data 114b and a second throttling process described herein to the incoming data 114a.

Although a certain number and arrangement of components is shown in FIG. 1, this is intended to be illustrative and non-limiting. Other examples may involve more components, fewer components, different components, or a different arrangement of the components shown in FIG. 1. Additionally, although only one of certain components (e.g., the local storage device 112 and the network card 108) are shown for simplicity, each of these blocks can represent any number and combination of their corresponding components.

Figure 2:
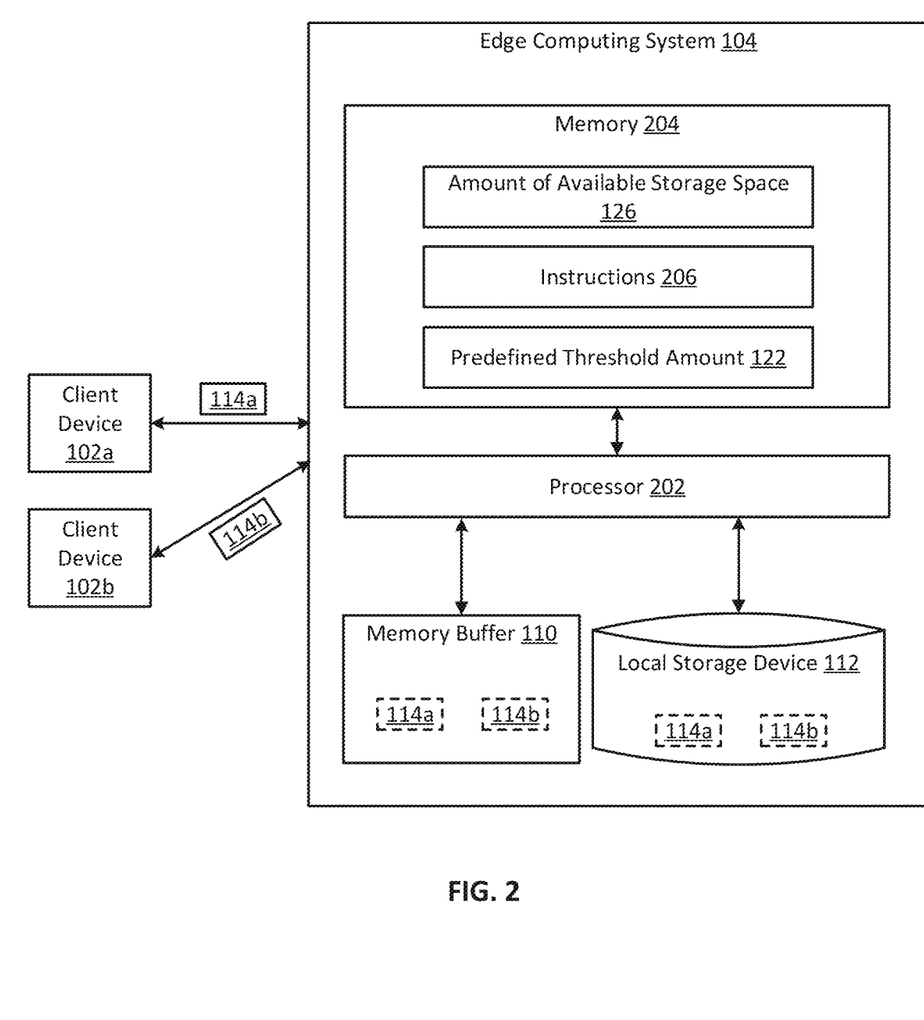
FIG. 2 is a block diagram of an example of an edge computing system according to some aspects of the present disclosure.

FIG. 2 is a block diagram of an example of an edge computing system 104 according to some aspects of the present disclosure. The edge computing system 104 includes a processor 202 communicatively coupled to a memory 204. In some examples, the processor 202 and the memory 204 can be part of the same computing device, such as the edge node 106 of FIG. 1. In other examples, the processor 202 and the memory 204 can be distributed from (e.g., remote to) one another.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C#, etc. In some examples, the instructions 206 can correspond to the monitoring module 138 of FIG. 1.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

The processor 202 can also be communicatively coupled to a memory buffer 110 and a local storage device 112. The memory buffer 110 can be positioned in any suitable location in the edge computing system 104. For example, the memory buffer 110 may be located in the memory 204, the local storage device 112, a network card (e.g., network card 108), or elsewhere. The local storage device 112 can also be positioned in any suitable location in the edge computing system 104. For example, the local storage device 112 may be internal or external to the memory 204.

The processor 202 can execute the instructions 206 to perform operations. For example, the processor 202 can determine that an amount of available storage space 126 in the local storage device 112 is less than a predefined threshold amount 122. Based on determining that the amount of available storage space 126 is less than the predefined threshold amount 122, the processor 202 can prevent incoming data 114a-b from the client devices 102a-b from being retrieved from the memory buffer 110 until the amount of available storage space 126 is greater than or equal to the predefined threshold amount 122. For example, the processor 202 may not retrieve the incoming data 114a-b from the memory buffer 110 until the amount of available storage space 126 is greater than or equal to the predefined threshold amount 122. Once the amount of available storage space 126 is greater than or equal to the predefined threshold amount 122, the processor 202 can retrieve the incoming data 114a-b from the memory buffer 110 and store the incoming data 114a-b in the local storage device 112. The processor 202 may then erase the incoming data 114a-b from the memory buffer 110. The processor 202 may also transmit acknowledgements of the incoming data 114a-b back to the client devices 102a-b.

Figure 3:
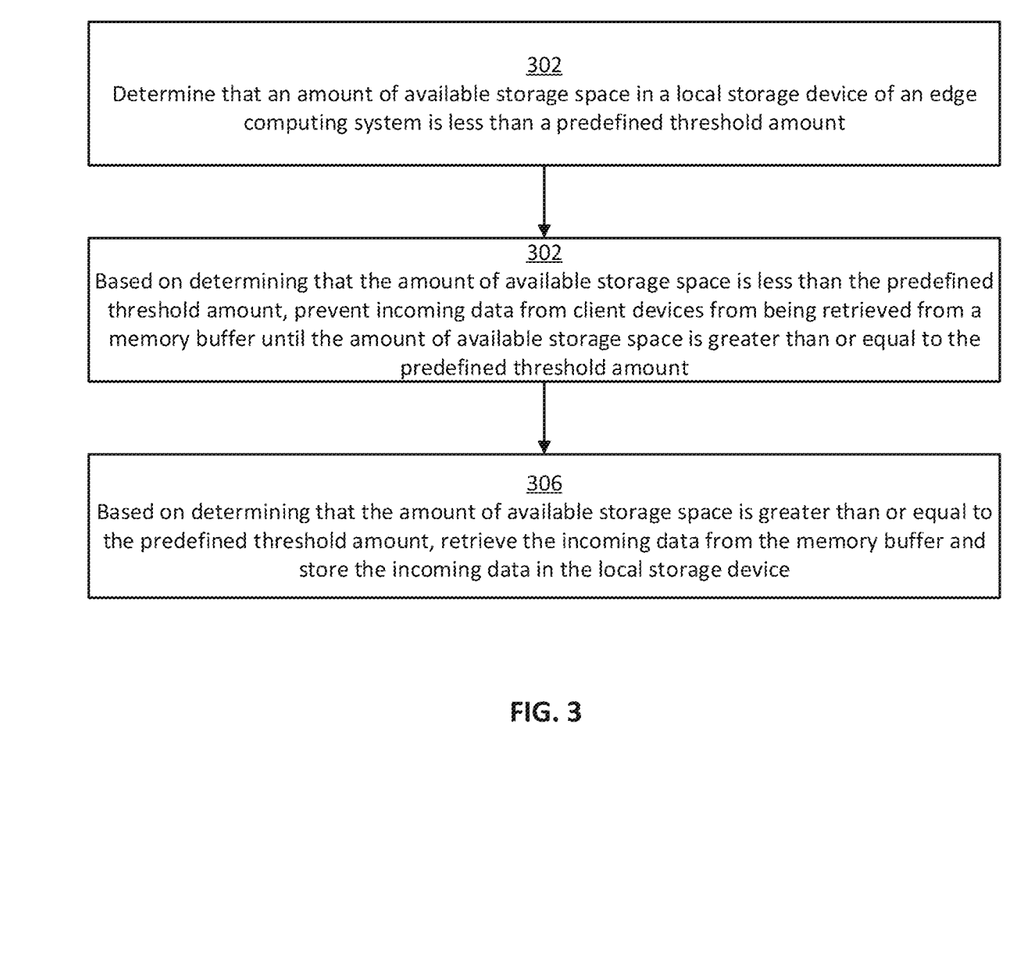
FIG. 3 a flow chart of an example of a process for preventing data overflow according to some aspects of the present disclosure.

In some examples, the processor 402 can implement the process shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, a processor 202 determines that an amount of available storage space 126 in the local storage device 112 of an edge computing system 104 is less than a predefined threshold amount 122. In some examples, the processor 202 can determine the amount of available storage space 126 in the local storage device 112 by communicating one or more commands to a controller associated with the local storage device 112. The processor 202 can then compare the amount of available storage space 126 to the predefined threshold amount 122 to determine whether the amount of available storage space 126 is greater than or equal to the predefined threshold amount 122.

In block 304, the processor 202 prevents incoming data 114a-b from client devices 102a-b from being retrieved from a memory buffer 110 until the amount of available storage space 126 is greater than or equal to the predefined threshold amount 122. The processor 202 can perform this prevention based on determining that the amount of available storage space 126 is less than the predefined threshold amount 122.

In block 306, the processor 202 retrieves the incoming data 114a-b from the memory buffer 110 and stores the incoming data 114a-b in the local storage device 112, based on determining that the amount of available storage space 126 is greater than or equal to the predefined threshold amount 122. For example, if the amount of available storage space 126 in the local storage device 112 increases to above the predefined threshold amount 122, the processor 202 can retrieve the incoming data 114a-b from the memory buffer 110 and store the incoming data 114a-b in the local storage device 112.

Although the above examples are described with respect to edge computing systems, it will be appreciated that similar principles can be applied to other types of computing systems that have limited computing resources. For example, similar principles may be applied to non-edge computing systems that receive more data than can be concurrently stored in a local storage device to prevent data overflows.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A non-transitory computer-readable medium comprising program code that is executable by a processor of a computing system for causing the processor to:
   determine that an amount of available storage space in a local storage device of the computing system is less than a predefined threshold amount;
   based on determining that the amount of available storage space is less than the predefined threshold amount, prevent incoming data from client devices from being retrieved from a memory buffer until the amount of available storage space is greater than or equal to the predefined threshold amount, wherein the memory buffer is separate from the local storage device;
   based on determining that the amount of available storage space is greater than or equal to the predefined threshold amount, retrieve the incoming data from the memory buffer and store the incoming data in the local storage device;
   determine a removal rate at which stored data is deleted from the local storage device subsequent to the stored data being transmitted by the computing system over a network to a remote storage device that is external to the computing system; and
   adjust the removal rate by switching from a first mode in which the stored data is asynchronously transmitted to the remote storage device to a second mode in which the stored data is synchronously transmitted to the remote storage device.

2. The non-transitory computer-readable medium of claim 1, further comprising program code that is executable by the processor for causing the processor to:
   determine a storage rate at which the incoming data is stored in the local storage device by the computing system;
   determine whether the storage rate is greater than or equal to the removal rate; and
   based on determining that the storage rate is greater than or equal to the removal rate, adjust the storage rate or the removal rate such that the storage rate is less than the removal rate.

3. The non-transitory computer-readable medium of claim 2, further comprising program code that is executable by the processor for causing the processor to decrease the storage rate by transmitting a communication to a client device among the client devices for causing the client device to slow down data transmission to the computing system.

4. The non-transitory computer-readable medium of claim 2, further comprising program code that is executable by the processor for causing the processor to:
predict that the amount of available storage space in the local storage device will be less than the predefined threshold amount at a future point in time based on historical information about prior data received from the client devices in the past; and
preemptively adjust the storage rate or the removal rate to prevent the amount of available storage space in the local storage device from being less than the predefined threshold amount at the future point in time.

5. The non-transitory computer-readable medium of claim 1, further comprising program code that is executable by the processor for causing the processor to repeatedly:
retrieve stored data from the local storage device;
transmit the stored data over the network to the remote storage device that is external to the computing system; and
subsequent to transmitting the stored data to the remote storage device, remove the stored data from the local storage device.

6. The non-transitory computer-readable medium of claim 1, wherein the incoming data includes first incoming data from a first client device and second incoming data from a second client device, and further comprising program code that is executable by the processor for causing the processor to:
in response determining that the amount of available storage space in the local storage device is less than the predefined threshold amount:
based on a first priority level associated with the first client device, prevent the first incoming data from being retrieved from the memory buffer until the amount of available storage space is greater than or equal to the predefined threshold amount; and
based on a second priority level associated with the second client device, retrieve the second incoming data from the memory buffer and store the second incoming data in the local storage device, the second priority level being higher than the first priority level.

7. The non-transitory computer-readable medium of claim 1, further comprising program code that is executable by the processor for causing the processor to:
based on determining that the amount of available storage space is less than the predefined threshold amount, forego transmitting one or more acknowledgement communications associated with the incoming data to the client devices, the one or more acknowledgement communications being configured to acknowledge receipt of the incoming data; and
based on determining that the amount of available storage space is greater than or equal to the predefined threshold amount, transmit the one or more acknowledgement communications associated with the incoming data to the client devices.

8. The non-transitory computer-readable medium of claim 1, wherein the computing system is an edge computing system.

9. A computing system, comprising:
a memory buffer configured to store first incoming data from a first client device and second incoming data from a second client device;
a local storage device that is separate from the memory buffer;
a processor communicatively coupled to the memory buffer and the local storage device; and
a memory including instructions that are executable by the processor for causing the processor to:
determine that an amount of available storage space in the local storage device is less than a predefined threshold amount; and
based on determining that the amount of available storage space is less than the predefined threshold amount:
based on a first priority level associated with the first client device, prevent the first incoming data from being retrieved from the memory buffer until the amount of available storage space is greater than or equal to the predefined threshold amount; and
based on a second priority level associated with the second client device, retrieve the second incoming data from the memory buffer and store the second incoming data in the local storage device, the second priority level being higher than the first priority level.

10. The computing system of claim 9, wherein the memory further includes instructions that are executable by the processor for causing the processor to:
determine a storage rate at which incoming data from client devices is stored in the local storage device by the computing system;
determine a removal rate at which stored data is deleted from the local storage device subsequent to the stored data being transmitted by the computing system over a network to a remote storage device that is external to the computing system;
determine whether the storage rate is greater than or equal to the removal rate; and
based on determining that the storage rate is greater than or equal to the removal rate, adjust the storage rate or the removal rate such that the storage rate is less than the removal rate.

11. The computing system of claim 10, wherein the memory further includes instructions that are executable by the processor for causing the processor to increase the removal rate by switching from (i) a first mode in which the stored data is asynchronously transmitted to the remote storage device, to (ii) a second mode in which the stored data is synchronously transmitted to the remote storage device.

12. The computing system of claim 10, wherein the memory further includes instructions that are executable by the processor for causing the processor to decrease the storage rate by transmitting a communication to a client device among the client devices for causing the client device to slow down data transmission to the computing system.

13. The computing system of claim 10, wherein the memory further includes instructions that are executable by the processor for causing the processor to:
predict that the amount of available storage space in the local storage device will be less than the predefined threshold amount at a future point in time based on historical information about prior data received from client devices in the past; and
preemptively adjust the storage rate or the removal rate to prevent the amount of available storage space in the local storage device from being less than the predefined threshold amount at the future point in time.

14. The computing system of claim 9, wherein the memory further includes instructions that are executable by the processor for causing the processor to repeatedly:
retrieve stored data from the local storage device;
transmit the stored data over a network to a remote storage device that is external to the computing system; and
subsequent to transmitting the stored data to the remote storage device, remove the stored data from the local storage device.

15. The computing system of claim 9, wherein the computing system is an edge computing system.

16. The computing system of claim 9, wherein the memory further includes instructions that are executable by the processor for causing the processor to:
based on determining that the amount of available storage space is less than the predefined threshold amount, forego transmitting an acknowledgement communication associated with the first incoming data to the first client device, the acknowledgement communication being configured to acknowledge receipt of the first incoming data; and
based on determining that the amount of available storage space is greater than or equal to the predefined threshold amount, transmit the acknowledgement communication associated with the first incoming data to the first client device.

17. A method comprising:
determining, by a processor of a computing system, that an amount of available storage space in a local storage device of the computing system is less than a predefined threshold amount;
based on determining that the amount of available storage space is less than the predefined threshold amount:
preventing, by the processor, incoming data from client devices from being retrieved from a memory buffer until the amount of available storage space is greater than or equal to the predefined threshold amount, wherein the memory buffer is separate from the local storage device; and
foregoing, by the processor, transmitting one or more acknowledgement communications associated with the incoming data to the client devices, the one or more acknowledgement communications being configured to acknowledge receipt of the incoming data; and
based on determining that the amount of available storage space is greater than or equal to the predefined threshold amount:
retrieving, by the processor, the incoming data from the memory buffer and store the incoming data in the local storage device; and
transmitting, by the processor, the one or more acknowledgement communications associated with the incoming data to the client devices.

18. The method of claim 17, further comprising:
determining a storage rate at which the incoming data is stored in the local storage device by the computing system;
determining a removal rate at which stored data is deleted from the local storage device subsequent to the stored data being transmitted by the computing system over a network to a remote storage device that is external to the computing system;
determining whether the storage rate is greater than or equal to the removal rate; and
based on determining that the storage rate is greater than or equal to the removal rate, adjusting the storage rate or the removal rate such that the storage rate is less than the removal rate.

19. The method of claim 18, further comprising:
predicting that the amount of available storage space in the local storage device will be less than the predefined threshold amount at a future point in time based on historical information about prior data received from the client devices in the past; and
preemptively adjusting the storage rate or the removal rate to prevent the amount of available storage space in the local storage device from being less than the predefined threshold amount at the future point in time.

20. The method of claim 17, wherein the incoming data includes first incoming data from a first client device and second incoming data from a second client device, and further comprising:
in response determining that the amount of available storage space in the local storage device is less than the predefined threshold amount:
based on a first priority level associated with the first client device, preventing the first incoming data from being retrieved from the memory buffer until the amount of available storage space is greater than or equal to the predefined threshold amount; and
based on a second priority level associated with the second client device, retrieving the second incoming data from the memory buffer and store the second incoming data in the local storage device, the second priority level being higher than the first priority level.

* * * * *